US012281509B2

(12) United States Patent
Opgenorth

(10) Patent No.: US 12,281,509 B2
(45) Date of Patent: Apr. 22, 2025

(54) AUTOMATIC EMERGENCY DOOR CLOSURE

(71) Applicant: JKO Improvements LLC, Oconomowoc, WI (US)

(72) Inventor: James L. Opgenorth, Oconomowoc, WI (US)

(73) Assignee: JKO Improvements LLC, Oconomowoc, WI (US)

( * ) Notice: Subject to any disclaimer, the term of this patent is extended or adjusted under 35 U.S.C. 154(b) by 847 days.

(21) Appl. No.: 16/668,898

(22) Filed: Oct. 30, 2019

(65) Prior Publication Data

US 2020/0131824 A1 Apr. 30, 2020

Related U.S. Application Data

(60) Provisional application No. 62/753,343, filed on Oct. 31, 2018.

(51) Int. Cl.
*E05F 1/00* (2006.01)
*E05D 11/10* (2006.01)
*E05F 1/12* (2006.01)

(52) U.S. Cl.
CPC ................ *E05F 1/006* (2013.01); *E05F 1/12* (2013.01); *E05Y 2900/134* (2013.01)

(58) Field of Classification Search
CPC ....... E05F 1/0006; E05F 15/72; E05F 15/611; E05F 1/006; E05D 11/10; E05D 11/1007; E05D 11/1028; E05D 2011/1035
See application file for complete search history.

(56) References Cited

U.S. PATENT DOCUMENTS 1,946,837 A * 2/1934 Clayton .............. E05D 11/1078 16/330
2,427,384 A * 9/1947 Bushko ..................... E05D 5/10 16/325
3,117,340 A * 1/1964 Arboll ....................... E05F 3/08 16/303
3,559,232 A * 2/1971 Crane ....................... E05F 3/16 267/156
3,629,900 A * 12/1971 Beerli, Jr. ........... E05D 11/1007 16/349
3,874,029 A * 4/1975 McCullough ....... E05D 11/1007 16/329
4,536,916 A * 8/1985 Storandt ................ E05F 3/221 16/49

(Continued)

*Primary Examiner* — Emily M Morgan
(74) *Attorney, Agent, or Firm* — Wong Meyer Smith & McConnell

(57) ABSTRACT

An automatic emergency door closure is provided that can be used with an existing door by inserting a hinge pin assembly into knuckles of hinge plates associated with the existing door. The hinge pin assembly is movable between a first position where the door is held in a regular use position in which it can be opened and closed and a second position where the door is released to a closed position. This movement from the first position to the second position may be as a result of a variety of triggers, including a message transmitted from a remote location or nearby heat. The assembly may include a hinge pin body that is inserted into the knuckles, a torsion spring that is configured to rotate the hinge pin body, and an activator that can be activated by the trigger to enable rotation of the hinge pin body.

14 Claims, 5 Drawing Sheets

(56) References Cited

U.S. PATENT DOCUMENTS 4,829,633 A * 5/1989 Kassner .............. E05D 11/1085 16/322
5,125,131 A * 6/1992 Leblanc .............. E05D 11/1007 16/329
5,408,726 A * 4/1995 Kent ................... E05D 11/1007 16/329
5,525,963 A * 6/1996 Purssey ................... E05F 1/006 49/31
5,687,507 A * 11/1997 Beran ..................... E05F 15/63 74/89.37
5,774,938 A * 7/1998 Kent ................... E05D 11/1007 16/332
5,887,317 A * 3/1999 Baker ................. E05D 11/1007 16/329
6,205,619 B1 * 3/2001 Jang .......................... E05D 5/10 16/50
6,658,694 B2 12/2003 Wang
6,928,699 B2 * 8/2005 Sawa ........................ E05F 3/20 16/314
7,155,776 B2 1/2007 Park
7,197,791 B1 * 4/2007 Smith ..................... E05D 11/06 16/334
7,966,693 B2 6/2011 Choi et al.
8,156,613 B2 * 4/2012 Smith ..................... E05D 11/06 16/376
8,220,202 B2 * 7/2012 Riley ...................... E05D 11/00 16/223
8,359,709 B2 * 1/2013 Van Gennep ....... E05D 11/1007 16/229
8,375,519 B1 * 2/2013 Cooper ................... E05F 1/006 16/386
8,387,210 B2 3/2013 Sawa
8,510,911 B2 8/2013 Sawa
8,522,400 B1 9/2013 Jablonski
8,584,318 B1 * 11/2013 Tu ......................... E05D 7/1016 16/262
8,646,154 B2 * 2/2014 Smith ................. E05D 11/1007 16/376
8,661,618 B2 3/2014 Jablonski
8,955,194 B2 2/2015 Teta
9,068,382 B1 * 6/2015 Hall .......................... E05D 5/12
9,587,419 B1 * 3/2017 Turner ...................... E05D 5/12
9,759,000 B2 9/2017 Stuart
9,926,731 B2 3/2018 Bacchetti
10,053,898 B1 * 8/2018 Lashley ................. G08B 21/18
11,053,722 B2 * 7/2021 Teta .......................... E05D 3/02
11,072,964 B2 * 7/2021 Teta ........................ E05F 1/006
2003/0208881 A1 * 11/2003 Li ....................... E05D 11/1007 16/330
2009/0009026 A1 * 1/2009 Biasiotto ................ F16M 11/06 310/306
2010/0218344 A1 * 9/2010 Van Gennep ....... E05D 11/1007 16/327
2010/0251520 A1 * 10/2010 Corso ....................... E05D 5/12 16/342
2011/0088220 A1 * 4/2011 Smith ................. E05D 11/1007 16/375
2011/0094058 A1 * 4/2011 Van Gennep ....... E05D 11/1007 16/327
2013/0219664 A1 8/2013 Burda
2013/0247329 A1 * 9/2013 Teta ........................ E05F 1/006 16/48.5
2013/0283569 A1 * 10/2013 Lin .................... E05D 11/1028 16/319
2014/0230191 A1 * 8/2014 Bertani ................... E05D 11/00 16/349
2014/0259532 A1 * 9/2014 Millard ............... E05D 11/1028 16/326
2014/0338151 A1 11/2014 Mitchell et al.
2015/0130287 A1 * 5/2015 Steudtner .................. E06B 7/28 307/104
2016/0370789 A1 * 12/2016 Zasowski ............. G05B 19/042
2018/0283078 A1 * 10/2018 Damboragama ..... E05F 15/614
2018/0305969 A1 * 10/2018 Docksteader ............ G08B 3/10
2019/0085606 A1 * 3/2019 Teta ...................... E05F 1/1207
2019/0390503 A1 * 12/2019 Teta ...................... E05F 1/1207
2020/0173213 A1 * 6/2020 Bucklin .................. E05F 1/006
2020/0181964 A1 * 6/2020 Wu ....................... E05F 1/1215

* cited by examiner

AUTOMATIC EMERGENCY DOOR CLOSURE

CROSS-REFERENCE TO RELATED APPLICATION

This application claims the benefit of U.S. provisional patent application Ser. No. 62/753,343 filed Oct. 31, 2018, the entire disclosure of which is hereby incorporated by reference.

FIELD OF THE INVENTION

The present invention relates to a device used with a preexisting door and associated hinge to enable automatic closure of the door in the event of an emergency. Specifically, the present invention relates to an automatic emergency door closure device that can be inserted into the hinge of a preexisting door, where the device allows the door to initially be in regular use wherein it can be opened and shut until an emergency event is detected, after which the closure device automatically closes the door.

BACKGROUND

Smoke detectors and fire alarms and other devices that proactively detect emergency devices are known in the art. When smoke, fire, or other dangerous events are detected by these devices, an audible and/or visual alarm may be sounded to alert those in close proximity to the detection device. Additionally, detection devices may be connected to security systems associated with a given building. The security systems may control access to various areas within the building. For instance, when smoke, a fire, or other events are detected in a certain area of the building, doors located adjacent to those areas can automatically be shut. Doing so serves multiple purposes, including keeping individuals out of the dangerous areas, and preventing spread of the smoke or fire to other areas of the building. By compartmentalizing the smoke or fire, there is more time for individuals within the building to be evacuated and for first responders to arrive and address the smoke or fire conditions. This increases the chances of saving lives and minimizing property damage.

Unfortunately, traditional security systems can be very expensive and require complicated hardware. Similarly, these systems traditionally would require special doors that are specifically designed for automatic closure based on input from the security system. Alternatively, expensive hinge systems could be installed onto preexisting doors.

Thus, what is needed is a system and method for automatically closing a door based on input from a smoke detector, fire alarm, carbon dioxide detector, or other detector device. What is further desirable is such a system and method that can be affordably manufactured. What is also further needed is a system that can be used with an existing door and associated hinges.

SUMMARY

The present invention provides a system and method for an automatic emergency door closer system that can be used with an existing door and hinges associated therewith. The automatic door closer system is configured to initially hold the door in a regular use position in which it can be opened and closed. Thereafter, the door can be automatically be closed by the system in light of a signal or other emergency event, such as presence of fire, smoke, or gas. Accordingly, a system and method in accordance with the present invention prevents the spread of fire, smoke, or gas to provide occupants with more time to exit the building, and more time for first responders to arrive at the scene before the smoke, gas, and/or fire spread about the building. Detection of the fire, smoke, or gas may occur at the automatic door closer system, or it may occur from a remote location.

According to one exemplary embodiment, the system includes a hinge pin assembly that is insertable into a plurality of knuckles extending from the hinge plates. The hinge pin assembly is movable from a first position in which the door is in a regular use position in which it can be opened and closed to a second position in which the door is released to a closed position. The hinge pin assembly may further include a hinge pin body that is insertable into the knuckles and extend outwardly therefrom, as well as a torsion spring that is configured to rotate the hinge pin when the hinge pin assembly is moved from the first position to the second position.

According to another aspect of the invention, the system may also include an outer sleeve that surrounds an upper portion of the hinge pin body, and an activator that is located within the outer sleeve. Movement of the activator may release the torsion spring to allow for rotational movement of the hinge pin body. For instance, the outer sleeve may comprise at least one slot formed in an inner sidewall, where at least one pin extends from the at least one slot to a side wall of the activator when the hinge pin assembly is in the first position. Additionally, the activator may have at least one clearance slot formed in the side wall. When the hinge pin assembly is moved to the second position, movement of the activator causes the at least one pin to move into the at least one clearance slot and out of the slot in the inner sidewall of the outer sleeve. As a result, the outer sleeve is released and therefore can move relative to the hinge pin body.

According to another aspect of the invention, a cap may by mounted to the outer sleeve adjacent to the activator. For instance, where the system is mounted to the top of a hinge, the cap may be mounted to a top portion of the outer sleeve. The activator may be moved toward the cap to result in the movement of the outer shaft, which in turn allows the hinge pin assembly to be moved from the first position to the second position. For instance, an electromagnet may be mounted to the cap. The electromagnet may be turned on, after which a magnetic signal is generated, which may cause the movement of the activator towards the cap. Also, the system may have a heat-expandable gas or liquid that is located within the outer sleeve. When heat is applied to the heat-expandable gas, the gas expands and moves the activator towards the cap. Further still, a heat source may be mounted within the outer sleeve. The heat source may be powered by a battery source, which in turn causes the gas to expand, causing the activator to move towards the cap.

According to yet another aspect of the invention, the system may further include a lower clutch assembly and an upper clutch assembly. The lower clutch assembly may include a lower clutch drive arm that may abut one of the pair of hinge plates, an upper surface, and a plurality of angled teeth extending upwardly from the upper surface. The upper clutch assembly may include a lower surface and a plurality of angled teeth extending downwardly from the lower surface. The plurality of angled teeth of the upper clutch assembly may be rotated to engage with the plurality of angled teeth of the lower clutch assembly. Further still, the system may include at least one angled spline formed in an outer surface of the hinge pin body adjacent to the upper clutch assembly. A plurality of pins may extend from the upper clutch assembly into the at least one angled spline. The upper clutch assembly may be rotated relative to the hinge pin body along the at least one angled spline from a first position to a second position. In the first position, the upper clutch assembly is distanced from the lower clutch assembly, whereas in the second position the plurality of angled teeth of the upper clutch assembly are engaged with the plurality of angled teeth of the lower clutch assembly.

According to another aspect of the invention, a method of using an automatic door closer includes inserting an automatic door closer system comprising a hinge pin assembly into a pair of existing hinge plate knuckles associated with a door, placing the automatic door closer system in a first position where the door is in a regular use position in which it can be opened and closed, moving the automatic door closer system to a second position where a torsion spring of the automatic door closer system rotates the hinge pin assembly, and moving the door from the regular use position to a closed position by the hinge pin assembly. The method may further include the detecting of an emergency signal, and the moving of the automatic door closer system from the first position to the second position. For instance, the emergency signal may be detected at a first location, a signal may be transmitted from the first location to a second location distanced from the first location, after which the automatic door closer system may be moved from the first position to the second position. This emergency signal may be taken from a smoke detector located at the first location. Further still, the method may include moving of an activator located within an outer sleeve of the automatic door closer system to a release position, releasing the torsion spring, rotating the hinge pin assembly, and rotating the door by the hinge pin assembly. Furthermore, the method may include activating an electromagnet located adjacent to the activator and moving the activator by the electromagnetic force created by the electromagnet to the release position. Alternatively, the method may include inserting a heat-expandable gas within the automatic door closer system, heating the automatic door closer system to expand the heat-expandable gas, and moving the activator by expansion of the heat expandable gas to the release position.

Other features and advantages of the invention will become apparent to those skilled in the art from the following detailed description and accompanying drawings. It should be understood, however, that the detailed description and specific examples, while indicating the preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

Figure 1:
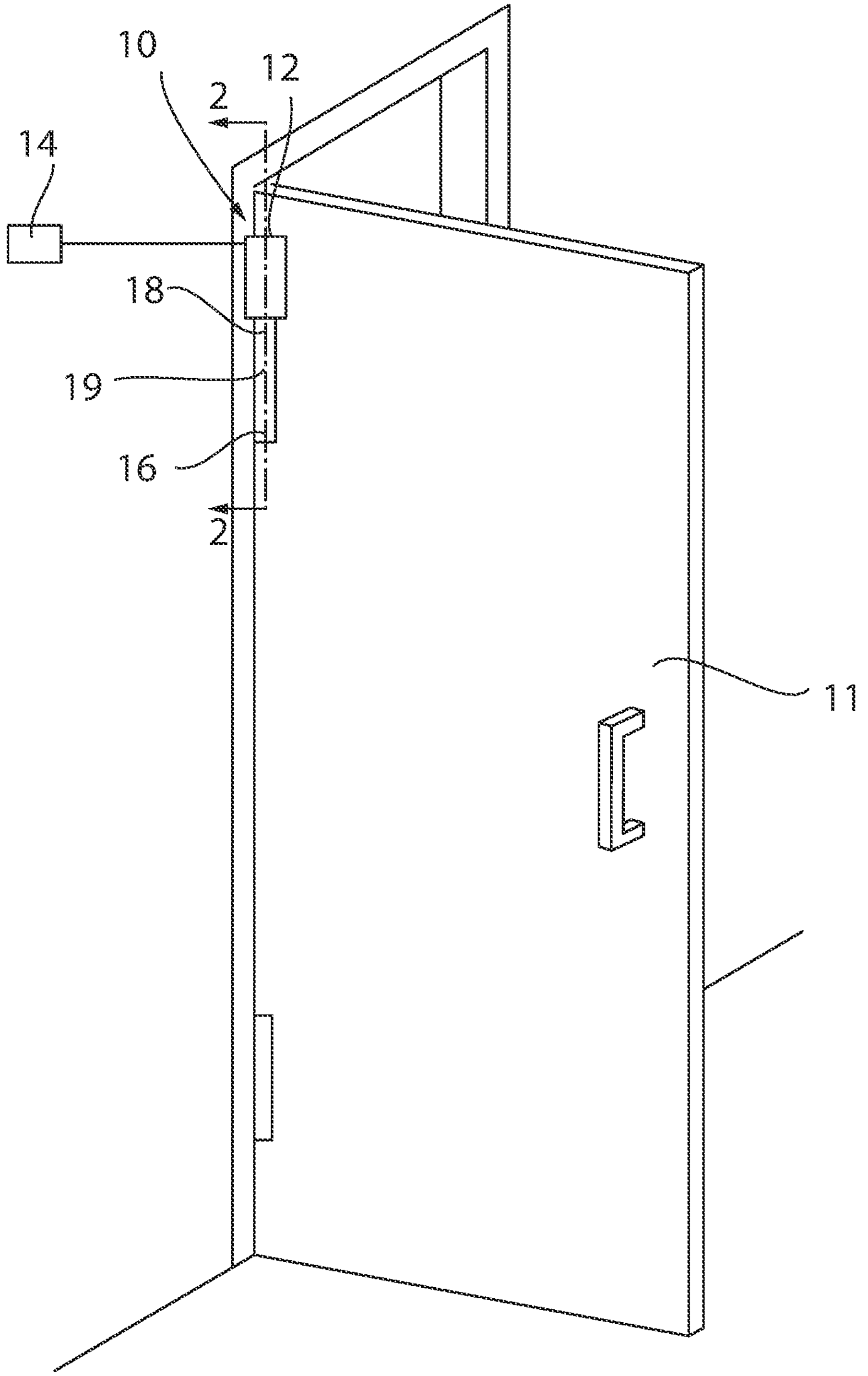
FIG. 1 is an isometric perspective view of an automatic emergency door closure of an exemplary embodiment installed into a hinge associated with a preexisting door where the automatic emergency door closure allowing the door to be opened in a first position in which the door is in a regular use position.

Before explaining embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

Referring to the following description in which like reference numerals represent like parts throughout the disclosure, an automatic emergency door closer 10 for use with an existing door 11 is shown in FIG. 1. More specifically, the automatic emergency door closer 10 includes a hinge pin assembly 12 connected to a control panel 14 that can be used with an existing hinge 16 of the door 11. The pin (not shown) that is supplied with the hinge 16 can be removed, and the hinge pin assembly 12 can thereafter be inserted into a first set of knuckles 18 and a second set of knuckles 19 associated with the hinge 16. In this way, an existing door 11 can easily and affordably be retrofitted to allow for the automatic closure of the door 11 in the event that an emergency event, such as the presence of smoke, heat, or carbon monoxide, is detected.

Figure 2:
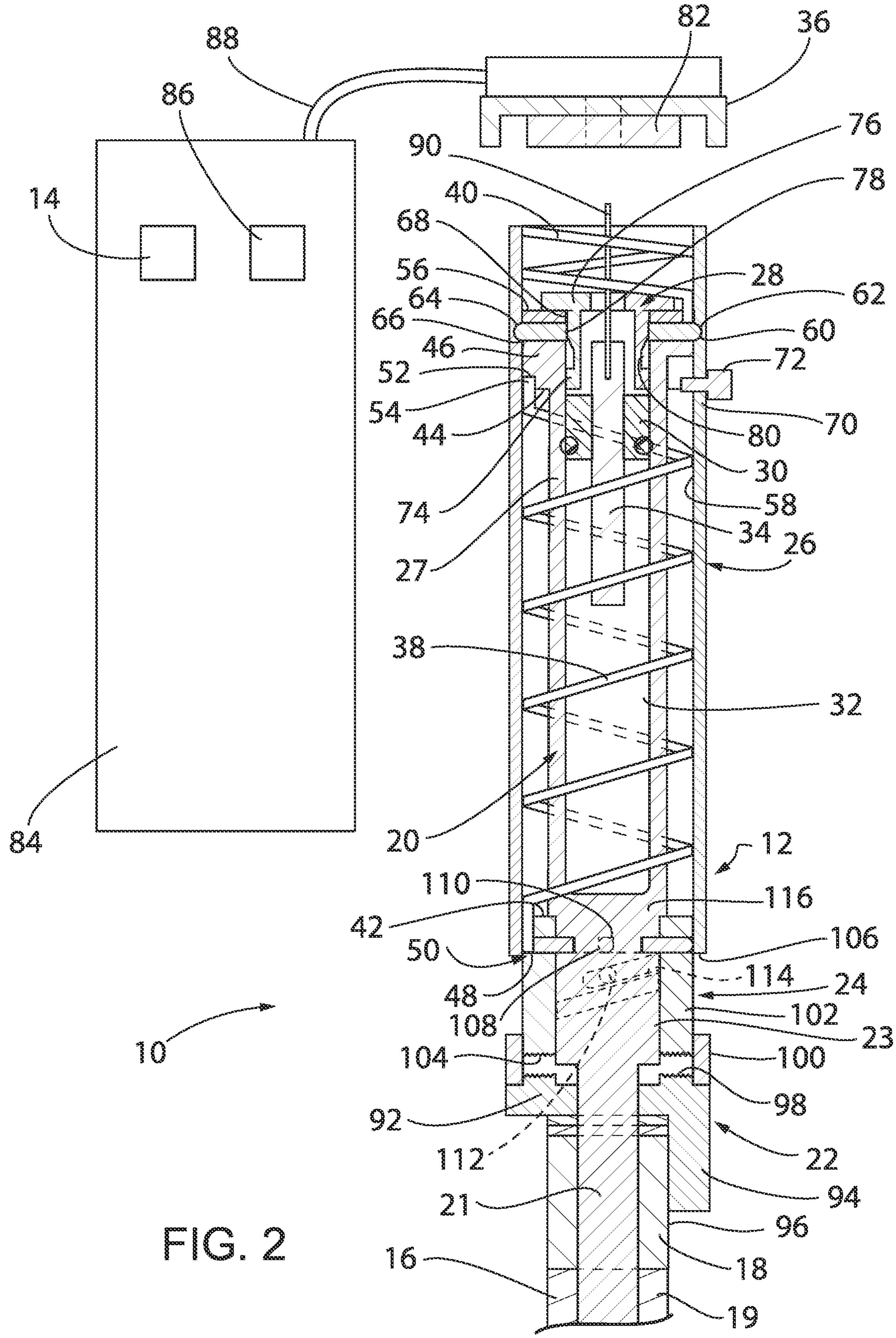
FIG. 2 is cross sectional view of the automatic emergency door closure of FIG. 1 in the first position.

Turning next to FIG. 2, a cross sectional view of the exemplary embodiment of the emergency door closer 10 taken about line 2-2 of FIG. 1 is shown in greater detail. In this embodiment, the hinge pin assembly 12 includes a hinge pin body 20 shown with cross hatching that is insertable into the knuckles 18 of the existing hinge 16. The hinge pin body 20 is cylindrical with varying diameters. As shown, the hinge pin body 20 has a first section 21 with an initial narrow diameter to fit within the knuckles 18, 19 of the existing hinge 16, and a second section 23 with wider diameters above the hinge 16. As shown, the hinge pin body 20 extends upwardly from the hinge 16, although it could similarly extend downwardly from the hinge 16. Additionally the hinge pin assembly 12 has a number of components that surround the hinge pin body 20. Directly adjacent to the upper-most knuckle 18 of the hinge 16, a lower clutch assembly 22 surrounds the hinge pin body 20. Above that, an upper clutch assembly 24 that is at least partially offset from the lower clutch assembly 22, surrounds the hinge pin body 20. Above that, an outer, upper sleeve 26 surrounds the hinge pin body 20. Of course, while the components are described as an upper clutch assembly and a lower clutch assembly with relation to the figures, these components could easily be inverted.

Next, the outer, upper sleeve 26 will be described. As previously discussed, the outer, upper sleeve 26 is distanced from the hinge 16, as shown in an upward direction, with the upper and lower clutch assemblies 22, 24 located therebetween. Of course, these components could similarly be located beneath the hinge 16, where the descriptions of the clutch assemblies would be inverted, and the outer sleeve being distanced from the hinge 16 with the clutch assemblies again located therebetween. In addition to surrounding an upper portion 27 of the hinge pin body 20, the outer, upper sleeve 26 contains a number of additional components that help to enable the automatic closure of the door 11. More specifically, the outer, upper sleeve 26 may contain at least one spring, a variety of openings and slots formed therein, as well as an activator 28 that initiates the closure of the door 11 upon a given signal.

Additionally, in the illustrated embodiment, the hinge pin body 20 contains a piston seal 30 located beneath the activator 28 that can be used to encourage upward movement of the activator 28. Within the inner cavity 32 of the hinge pin body 20, various gas or liquid materials may be housed that expand with heat, such as ammonia. The piston seal 30 also prevents the gas or expandable fluid from escaping the cavity 32. By including this gas or liquid within the cavity 32, the closer 10 may be activated in light of a significant heat source, for instance a fire, as will further be described below. Additionally, the piston seal 30 may contain a heat source 34 that can alternatively be activated to enable movement of the activator 28, as will also be further described below. The heat source 34 can also be held in place by the piston seal 30. A cap 36 may be mounted to the top of the outer, upper sleeve 26 to further seal contents of the outer, upper sleeve 26.

As shown, the outer, upper sleeve 26 contains two springs 38, 40. The first spring is a torsion spring 38. The torsion spring 38 is located in the bottom of the outer, upper sleeve 26. The torsion spring 38 extends from a top surface 42 of the upper clutch assembly 24 upwardly to a bottom surface 44 of a top portion 46 of the hinge pin body 20. For instance, as shown a first bottom end 48 of the torsion spring 38 is grounded downwardly into an opening 50 formed in the top surface 42 of the upper clutch assembly 24. Also as shown, a second upper end 52 of the torsion spring 38 is grounded upwardly into an opening 54 formed in the bottom surface 44 of the top portion 46 of the hinge pin body 20. The outer, upper sleeve 26 also contains the second spring 40 that is located above a top flange 56 of the top portion 46 of the hinge pin body 20. The second spring 40 has a diameter slightly greater than the diameter of the top flange 76 of the activator 28, which is also located above the top portion 46 of the hinge pin body 20. This allows the activator 28 to move relative to the hinge pin body 20 without contacting the second spring 40.

Additionally, the outer, upper sleeve 26 has openings and grooves to enable movement of the outer, upper sleeve 26 relative to the hinge pin body 20. For instance, the inner surface 58 of the outer, upper sleeve 26 may have at least one groove 60 formed therein towards the top of the sleeve 26 adjacent to the activator 28 to facilitate placement of pins 62. In one embodiment, the outer, upper sleeve 26 has a single continuous groove 60 extending around the outer, upper sleeve 26. This can be simply and easily machined into the inner surface 58 of the outer, upper sleeve 26. Alternatively, four dimples (not shown) can be formed into the inner surface of the outer, upper sleeve 26 and located equidistantly around the outer, upper sleeve 26. This groove 60 is configured to coincide with and initially contain four pins 62 while the emergency door closer 10 is in an initial position. A first end 64 of each of these pins 62 is seated against the groove 60 and a second end 66 of each of these pins 62 is seated against an outer edge 68 of the activator 28.

The outer, upper sleeve 26 also has at least one channel hole 70 formed therein that is configured to accept a bolt 72, such as a shoulder bolt. The channel 70 is sized to have a width large enough to receive the bolt 72, and a height greater than the height of the bolt 72 that extends downwardly along the outer, upper sleeve 26. The bolt 72 is configured to be threaded through the channel 70 formed in the outer sleeve 26 and into a threaded opening (not shown) in the hinge pin body 20 in order to secure the outer, upper sleeve 26 and the hinge pin body 20 together. This prevents rotational motion of the outer, upper sleeve 26 while the other components of the emergency door closer 10 move and rotate. The location of the bolt 72 and the dimensions of the channel 70 allow the outer, upper sleeve 26 to move upwardly relative to the initial resting position, but not downwardly from the initial position.

The activator 28 will now be described. The activator 28 includes a base side wall 74 having the outer edge 68 and runs substantially parallel with the height of the hinge pin body 20 and a top wall 76 having a diameter that is greater than the diameter of the side wall 74. The activator 28 is configured to nest within the top of the hinge pin body 20. Additionally, the top portion 46 of the hinge pin body 20 has four slip fit holes 78 to accept four vertical movement pins 62. These pins 62 initially reside outwardly with the respective pin ends 64 inserted into the groove 60 formed in the sleeve 26 when the emergency door closer 10 is in the non-activated position. The activator 28 has one continuous clearance slot 80 formed within the side wall 74 around the perimeter of the activator 28. In the illustrated embodiment, the activator 28 has a clearance slot 80, with the slot 80 being configured to accept the second end 66 of the pins 62 extending from the outer, upper sleeve 26 when activation of the closer 10 occurs, as will further be described below. Alternatively, four slots or dimples (not shown) could similarly be formed equidistantly around the perimeter of the activator 28. At least a portion of the top wall 76 of the activator 28 is made of a metallic material having a first polarity.

As previously discussed, the cap 36 is mounted to the outer, upper sleeve 26. The cap 36 may contain an electromagnet 82 that can be powered on to a second polarity that attracts the metallic material of the activator 28, which in turn can be used to displace the activator 28. An external housing 84 containing the control panel 14 may be mounted adjacent to the cap 36, with a battery power source 86 with at least one wire or cord 88 that connects the external housing 84 to the cap 36. The external housing 84 may also include other computers or power sources (not shown), as well as other features common to emergency closure events, such as LED lights, strobe lights, blinking lights, etc. (not shown). Various wiring 90 can connect the battery power source 86 to various components within the hinge pin assembly 12, including the electromagnet 82 and the heat source 34.

Moving on, the upper and lower clutch assemblies 22, 24 will now be described in more detail. The lower clutch assembly 22 includes a base 92 and a magnetic lower clutch drive arm 94. The base 92 surrounds the hinge pin body 20 and is located directly above the hinge 16. The magnetic lower clutch drive arm 94 is mounted flush with a front face 96 to the hinge 16. A plurality of angled teeth 98 extend upwardly from the top surface of the base 92. Additionally, as shown the lower clutch assembly 22 includes an outer wall 100 that extends slightly upwardly from the top of the lower clutch assembly 22 around the upper clutch teeth 104 described below.

The upper clutch assembly 24 comprises a cylindrical body 102 with additional angled teeth 104 extending downwardly from the bottom edge of the body 102. The teeth 104 of the upper clutch assembly 24 and the teeth 98 of the lower clutch assembly 22 are compatible with one another, such that when the upper clutch assembly 24 is rotated while it moves downwardly, the teeth 98, 104 engage with one another to allow the upper clutch assembly 24 to rotate the lower clutch assembly 22.

Additionally, the upper clutch assembly 24 may have at least pin 110 pressed in the cylindrical body 102 adjacent to the bottom lip 106 of the outer, upper sleeve 26. In one embodiment, there are four pins 110 pressed equidistantly in the cylindrical body 102. These pins 110 are to be retained within the grooves 108 in the bottom lip 106 of the outer, upper sleeve 26 when the outer, upper sleeve 26 is in the initial lowered position. As will further be described below, when the outer, upper sleeve 26 is moved upwardly during actuation, these pins 110 are released to initiate rotational movement of the assembly 12.

Additionally, the upper clutch assembly 24 may have additional pins 112 extending therefrom to enable movement of the upper clutch assembly 24 rotationally downward. More specifically, these pins 112 extend inwardly into angled spline grooves 114 that are formed in outer wall surface 116 of the hinge pin body 20. As shown, there are two angled spline grooves 114 located on opposite ends of the hinge pin body 20. Because of the angled shape of the spline grooves 114, when the assembly 12 is rotated, the upper clutch assembly 24 is initially rotated downwardly along the spline grooves 114 in order for the teeth 98, 104 of both clutch assemblies 22, 24 to engage with one another. Because of the limited travel path of these spline grooves 114, they also prevent over-rotation of the upper clutch assembly 24.

Operation of the closer 10 will now be described. Initially, a triggering event is communicated to the control panel 14. For instance, the triggering event may be transmitted from a remote location, which would allow the closer 10 to be activated even if the triggering event occurs a distance away from the closer 10. Once the triggering even occurs, movement of the closer 10 is initiated. Operation of the closer 10 may be initiated in a number of ways. First, operation may be initiated by the electromagnet 82. When this occurs, power from the battery power source 86 is supplied to the electromagnet 82 to initiate the polarity of the electromagnet 82, which in turn causes the activator 28 to move upwardly towards the electromagnet 82. Second, operation may be initiated by the heat source 34. For this to occur, power from the battery power source 86 is supplied to the heat source 34 through wiring 90, and the heat source 34 causes the ammonia or other gases or liquids located within the cavity 32 to expand. When this occurs, the piston seal 30 is moved upwardly, and eventually pushes the activator 28 upwardly. Both the electromagnet 82 and the heat source 34 could similarly be supplied with power simultaneously. This could be desirable in the event that one of the two mechanisms were to fail. Finally, operation can be initiated when the entire assembly 12 is heated to a desired temperature, in which case again the ammonia or other gases or chemicals expand to move the piston seal 30 upwardly. Again, the piston seal 30 contacts the activator 28 and moves it in an upward direction as well. This could occur when a fire is located directly adjacent to the assembly 12 if the triggering event is not communicated from a remote location, or when the triggering event is communicated from a remote location but the electromagnet 82 and heat source 34 fail. However, as described above, oftentimes it is desired to activate the emergency door closer 10 when the triggering event is far away in order to minimize damage or spread of harmful fire, smoke, and carbon monoxide.

Figure 3:
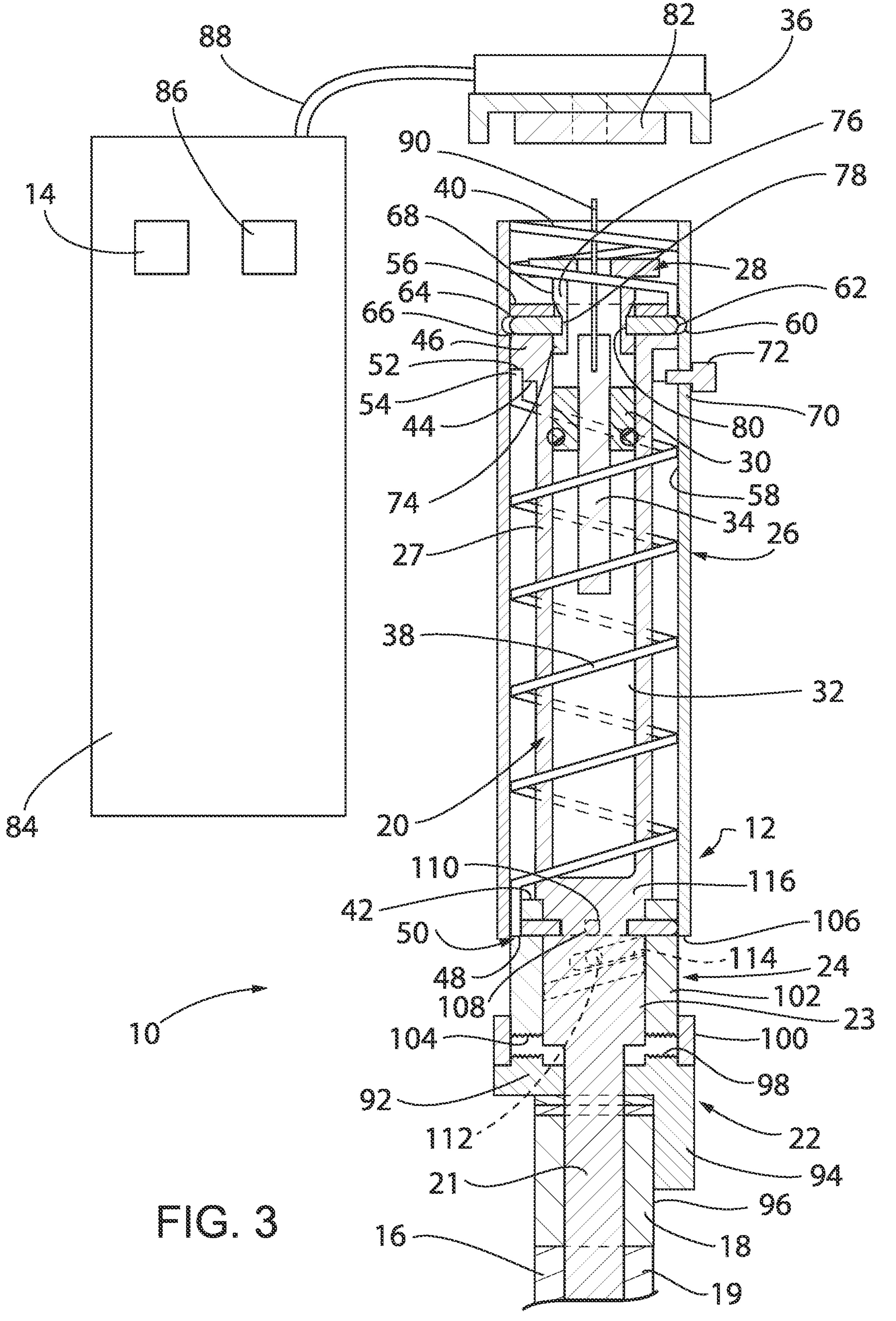
FIG. 3 is cross sectional view of the automatic emergency door closure of FIGS. 1 and 2 in a first intermediate position.
Figure 4:
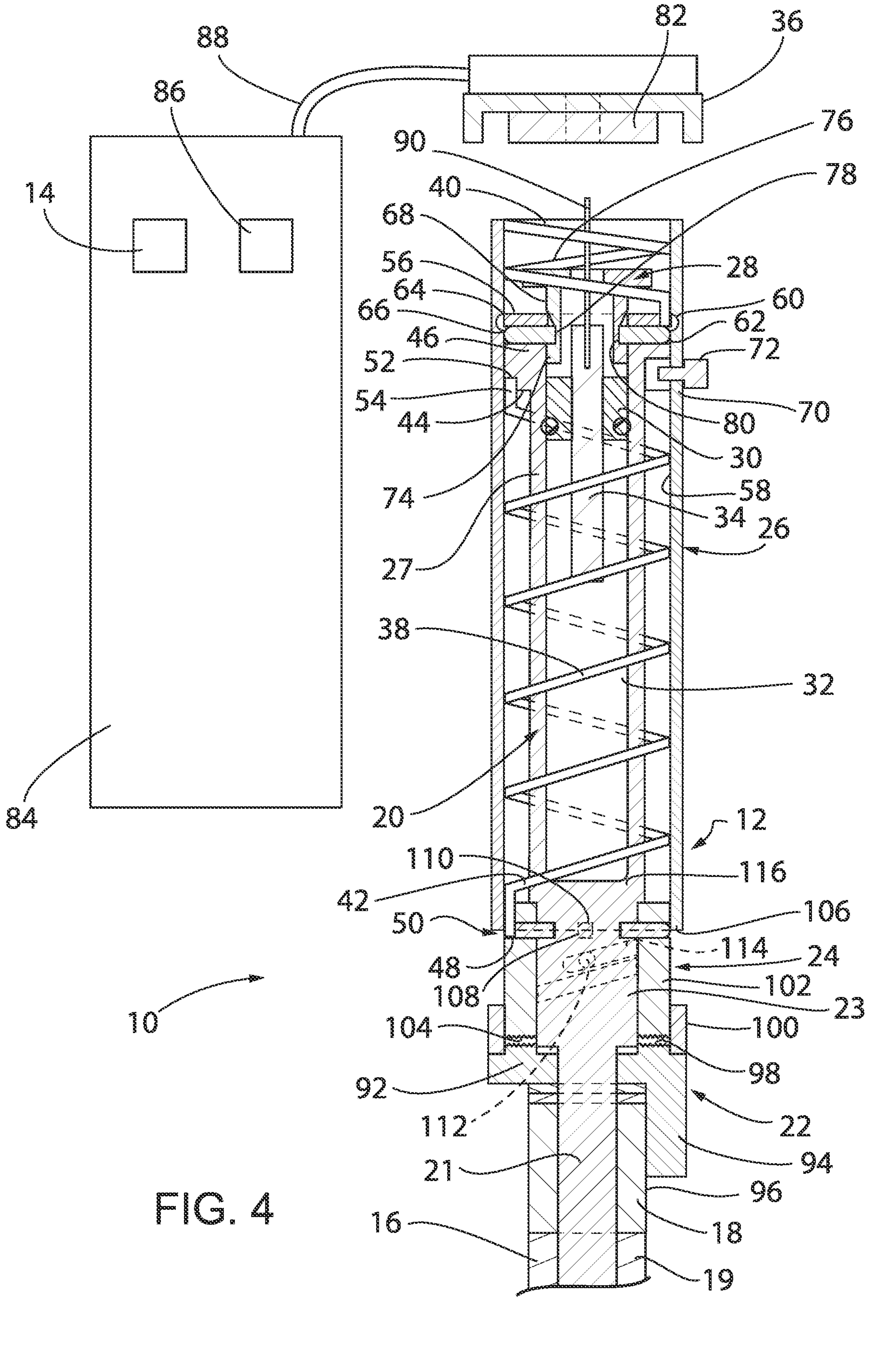
FIG. 4 is cross sectional view of the automatic emergency door closure of FIGS. 1-3 in a second intermediate position.
Figure 5:
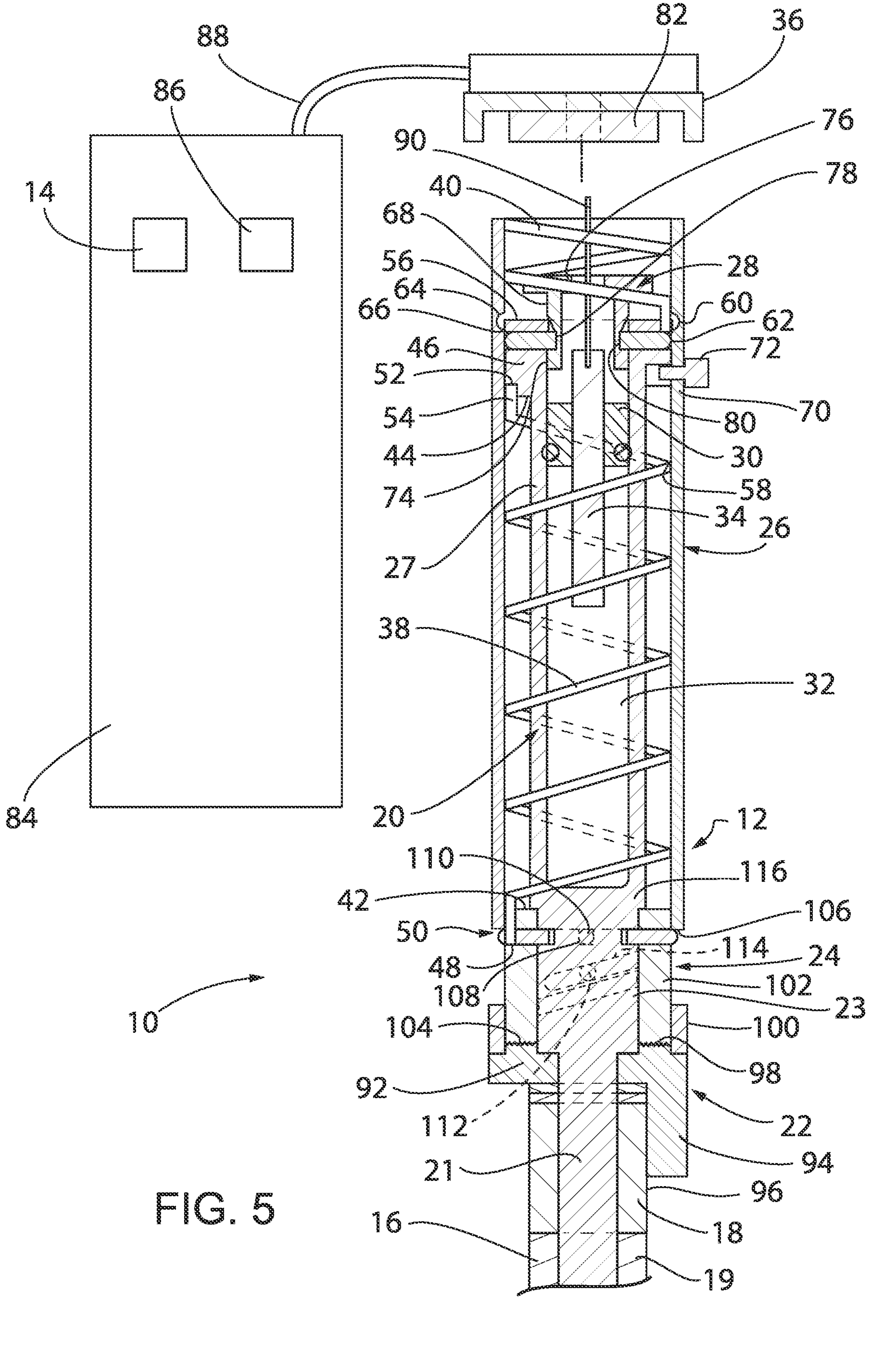
FIG. 5 is cross sectional view of the automatic emergency door closure of FIGS. 1-4 in a second position in which the door is released to a closed position.

Regardless of how operation is initiated, the activator 28 is initially moved upwardly, as can be seen in FIG. 3. While this occurs, the pins 62 that extend into the grooves 60 in the inner surface 58 of the outer, upper sleeve 26 slide into the clearance slot or groove 80 formed in the side wall 74 of the activator 28, as also seen in FIG. 3. When this occurs, the first ends 64 of the pins 62 are moved outside of the grooves 60 in the inner surface 58 of the outer, upper sleeve 26, freeing the outer, upper sleeve 26 to move relative to assembly 12. This can be seen in FIG. 4. As a result, the top spring 40 functions to move the outer, upper sleeve 26 in an upward direction. When this occurs, the press-fit pins 110 that were previously held in grooves 108 formed in the outer, upper sleeve 26 to be released as seen in FIG. 5. From here, the upper clutch assembly 24 rotates downwardly such that the teeth 104 of the upper clutch assembly 24 engage with the teeth 98 of the lower clutch assembly 22, which again can be seen in FIG. 5. From here, the power of the torsion spring 38 causes the upper clutch assembly 24, the lower clutch assembly 22, and the hinge pin body 20 to rotate, which also causes the hinge 16 to rotate causing the door to close.

Once the emergency event has been dealt with, the emergency door closer 10 can be returned to its initial position, once all necessary components have been reset. First, the assembly upper clutch assembly 24 can simply be rotated in the opposite direction. Various openings (not shown) may be formed in the upper clutch assembly 24, which would enable a wrench or other holder tool (not shown) to be used for added leverage in rotating the upper clutch assembly 24. Such a tool could be mounted to the housing 84 for added convenience. While the upper clutch assembly 24 is rotated the upper clutch assembly 24 travels along the spline grooves 114 formed in the hinge pin body 20 such that it rotates upwardly so that the teeth 104 of the upper clutch assembly 24 and the teeth 98 of the lower clutch assembly 22 are again separated from one another. Once the upper clutch assembly 24 returns to its original location, the pins 110 can be returned to their original positions, and then the outer, upper sleeve 26 can be slid down to its original position. Additionally, a button (not shown) may be compressed in order to reset the activator 28 and return it to its original position, and rotate the lower clutch 22 so that it contacts the hinge plate 16.

While the illustrated embodiment uses a torsion screw and splines to achieve the desired rotational movement, it should be noted that many other combinations of features could similarly be used. For instance, a linear spring could be used in combination with a lead screw. The lead screw could have as little as one groove formed therein at a steep inclination, or it could have multiple grooves formed therein. Such an embodiment would allow the linear motion of the spring can be translated to rotational motion.

To install the emergency door closer 10, the assembly 12 can be simply pressed through the top of the hinge 16. Alternatively, or additionally, it can be pressed in and secured in place from the bottom. Additional hardware and/or fasteners such as adhesives can also be used at the bottom end of the hinge 16 to further secure the assembly 12 to the hinge 16. Thereafter, the external housing 84 can be mounted adjacent to the assembly 12.

Of course, while the illustrated embodiment shows an assembly 12 that would be used to rotate a door in a counter-clockwise direction, the various components could be reversed in order to achieve an assembly capable of rotating the door in a clockwise direction. Stated differently, the assembly 12 could be used with a right-handed hinged door or a left-handed hinged door by inverting the components of the assembly 12.

The proportions of the various components are not necessarily accurate and to scale, but rather are exemplary in nature, and the specific proportions of the inventive automatic emergency door closer and hinge pin assembly need not be limited therein. Additionally, while the components are generally shown to be located above the existing hinge, they could similarly be relocated beneath the hinge or to the side to avoid interference with the door while it closes.

Additionally, of course, the hinge pin could also include a variety of different washers, screws, and the like in both the locations shown in the figures, as well as other locations. Further still, various grooves, channels, balls, pins, and the like could similarly be used to enable rotational movement of the inventive door closer. Other spring configurations could also be used to achieve the desired rotational movement.

It should be understood that the above description, while indicating representative embodiments of the present invention, is given by way of illustration and not of limitation. Many changes and modifications may be made within the scope of the present invention without departing from the spirit thereof, and the invention includes all such modifications.

Various additions, modifications, and rearrangements are contemplated as being within the scope of the following claims, which particularly point out and distinctly claim the subject matter regarding as the invention, and it is intended that the following claims cover all such additions, modifications, and rearrangements.

I claim:

1. An automatic emergency door closer system for use with a pair of existing hinge plates associated with a door comprising:
- a hinge pin assembly insertable into a plurality of knuckles extending from the pair of existing hinge plates, the hinge pin assembly further comprising:
- a hinge pin body inserted into the plurality of knuckles and extending outwardly therefrom; and
- a torsion spring configured to rotate the hinge pin body;
- an outer sleeve surrounding an upper portion of the hinge pin body, the outer sleeve comprising at least one groove formed in an inner sidewall; and
- an activator located within the outer sleeve, the activator comprising:
  - a side wall; and
  - at least one clearance slot formed in the side wall;
  - wherein the hinge pin assembly is movable between:
    - a manual use position, in which the door can be moved between an open position and a closed position; and
    - a closing position, in which the door is in the closed position;
  - wherein the hinge pin assembly is moved from the manual use position to the closing position in response to a signal;
  - wherein the hinge pin assembly is moveable from the closing position back to the manual use position in which the door can be moved between the open position and the closed position
  - wherein movement of the activator releases the torsion spring to allow rotational movement of the hinge pin body;
- wherein at least one pin extends from the at least one groove to the side wall when the hinge pin assembly is in the manual use position; and
- wherein movement of the activator causes the at least one pin to move into the at least one clearance slot and out of the at least one groove in the inner sidewall of the outer sleeve to release the outer sleeve to move relative to the hinge pin body.

2. The system of claim 1, further comprising:
- a cap mounted to a top portion of the outer sleeve; and
- an electromagnet mounted to the cap;
- wherein the activator is moved by the electromagnet.

3. The system of claim 1, further comprising a heat-expandable material located within the outer sleeve;
- wherein the activator is moved due to the expansion of the heat-expandable material.

4. The system of claim 3, further comprising a heat source mounted within the outer sleeve that is heated by a battery source mounted adjacent to the hinge pin assembly.

5. The system of claim 1, further comprising:
- a lower clutch assembly comprising:
  - a lower clutch drive arm abutting one of the pair of hinge plates;
- an upper surface; and
  - a plurality of angled teeth extending upwardly from the upper surface; and
- an upper clutch assembly comprising:
  - a lower surface; and
  - a plurality of angled teeth extending downwardly from the lower surface;
- wherein the plurality of angled teeth of the upper clutch assembly are rotated to engage the plurality of angled teeth of the lower clutch assembly.

6. The system of claim 5, further comprising at least one angled spline; and at least one second pin extending from the hinge pin body through the at least one angled spline; wherein the upper clutch assembly rotates relative to the hinge pin body along the at least one angled spline.

7. The system of claim 1 wherein the signal is triggered by one of a detection of heat, a detection of smoke, a detection of carbon monoxide, or threat of security breach.

8. An automatic emergency door closer system for use with a pair of existing hinge plates associated with a door comprising:
- a hinge pin assembly comprising a hinge pin body insertable into a plurality of knuckles extending from the pair of existing hinge plates;
- at least one angled spline groove;
- at least one first pin extending from the hinge pin body through the at least one angled spline groove;
- a lower clutch assembly surrounding the hinge pin body and comprising a plurality of upwardly extending angled teeth;
- an upper clutch assembly surrounding the hinge pin body and comprising a plurality of downwardly extending angled teeth, wherein the upper clutch assembly is movable about the angled spline groove between:
  - a first position in which the upper clutch assembly is distanced from the lower clutch assembly; and
  - a second position in which the downwardly extending angled teeth engage with the upwardly extending angled teeth of the lower clutch assembly;
- a torsion spring grounded into the upper clutch assembly;
- an activator comprising at least one clearance slot;
- an outer sleeve comprising at least one groove configured to receive at least one second pin that extends to the side wall of the activator; and at least one second pin engageable with one or more of the clearance slot of the activator and the at least one groove of the outer sleeve;

wherein the hinge pin assembly is movable between:

a regular use position, in which the door can be moved between an open position and a closed position; and a close position, in which the door is in the closed position;

wherein the hinge pin assembly is moved from the manual use position to the closing position in response to a signal;

wherein the hinge pin assembly is moveable from the closing position back to the manual use position in which the door can be moved between the open position and the closed position; and wherein the at least one pin moves from the at least one groove of the outer sleeve into the clearance slot of the activator to release the outer sleeve to enable movement of the outer sleeve relative to the hinge pin body.

9. The automatic emergency door closer system of claim 8, wherein the signal is triggered by one of a detection of heat, a detection of smoke, a detection of carbon monoxide, or threat of security breach.

10. The automatic emergency door closer system of claim 8, wherein the signal is communicated from a remote location.

11. The automatic emergency door closer system of claim 8, further comprising an electromagnet located adjacent to the activator that is configured to generate a signal to move the activator.

12. The automatic emergency door closer system of claim 8, further comprising:

a bottom lip of the outer sleeve;

at least one bottom lip groove formed in the bottom lip of the outer sleeve;

at least one third pin retained in the at least one bottom lip groove formed in a bottom lip of the outer sleeve;

wherein the at least one third pin retained in the at least one bottom lip groove formed in the bottom lip of the outer sleeve is released to initiate rotational movement.

13. The automatic emergency door closer system of claim 8, further comprising a channel hole formed in the outer sleeve; and a bolt insertable into the channel hole, wherein the bolt is configured prevent rotational motion of the upper sleeve.

14. The automatic emergency door closer system of claim 8, wherein the lower clutch assembly further comprises a drive arm configured to engage with the pair of existing hinge plates when the lower clutch assembly is rotated.

* * * * *